(12) United States Patent
Marshall

(10) Patent No.: US 7,767,903 B2
(45) Date of Patent: *Aug. 3, 2010

(54) SYSTEM AND METHOD FOR THERMAL TO ELECTRIC CONVERSION

(76) Inventor: Robert A. Marshall, 324 Doe Run, Georgetown, TX (US) 78628

( * ) Notice: Subject to any disclaimer, the term of this patent is extended or adjusted under 35 U.S.C. 154(b) by 1667 days.

This patent is subject to a terminal disclaimer.

(21) Appl. No.: 10/984,262

(22) Filed: Nov. 9, 2004

(65) Prior Publication Data

US 2005/0109387 A1  May 26, 2005

Related U.S. Application Data

(60) Provisional application No. 60/518,488, filed on Nov. 10, 2003.

(51) Int. Cl.
*H01L 25/00*  (2006.01)
(52) U.S. Cl. .............. 136/243; 136/246; 136/258; 126/578; 323/234
(58) Field of Classification Search ............ 136/206, 136/253; 323/299
See application file for complete search history.

(56) References Cited

U.S. PATENT DOCUMENTS

| | | | | |
|---|---|---|---|---|
| 4,111,189 | A * | 9/1978 | Dizon | 126/400 |
| 4,316,048 | A | 2/1982 | Woodall | |
| 4,375,662 | A * | 3/1983 | Baker | 363/95 |
| 4,571,812 | A | 2/1986 | Gee | |
| 4,604,567 | A * | 8/1986 | Chetty | 323/299 |
| 5,058,565 | A | 10/1991 | Gee et al. | |
| 5,177,977 | A * | 1/1993 | Larsen | 62/235.1 |
| 5,601,661 | A * | 2/1997 | Milstein et al. | 136/253 |
| 5,605,769 | A * | 2/1997 | Toms | 429/9 |
| 5,867,011 | A * | 2/1999 | Jo et al. | 323/299 |
| 5,932,029 | A | 8/1999 | Stone et al. | |
| 6,284,969 | B1 | 9/2001 | Fraas et al. | |
| 6,297,496 | B1 | 10/2001 | Lin et al. | |
| 6,358,854 | B1 | 3/2002 | Fleming et al. | |
| 6,388,795 | B1 | 5/2002 | Fleming et al. | |
| 6,414,332 | B1 | 7/2002 | Lin et al. | |
| 6,489,553 | B1 | 12/2002 | Fraas et al. | |
| 6,538,193 | B1 | 3/2003 | Fraas | |
| 6,583,350 | B1 * | 6/2003 | Gee et al. | 136/253 |
| 6,611,085 | B1 | 8/2003 | Gee et al. | |
| 6,768,256 | B1 | 7/2004 | Fleming et al. | |
| 6,783,653 | B2 | 8/2004 | Mahoney et al. | |
| 6,786,716 | B1 | 9/2004 | Gardner et al. | |
| 6,812,482 | B2 | 11/2004 | Fleming et al. | |
| 2003/0156319 | A1 | 8/2003 | John et al. | |

FOREIGN PATENT DOCUMENTS

WO      WO 01/86038 A2     11/2001

OTHER PUBLICATIONS

Bechger, AF Koenderink, WL Vos, Emission Spectra and Lifetimes of R6G Dye on Silica-Coated Titania Powder, Langmuir, 2002, 18:2444-2447.*

(Continued)

*Primary Examiner*—Alexa D Neckel
*Assistant Examiner*—Miriam Berdichevsky

(57) ABSTRACT

A system and method for lower cost, solar thermal generation includes a thermal input block, and an energy storage block.

13 Claims, 3 Drawing Sheets

OTHER PUBLICATIONS

Freymann, John, Tungsten inverse opals: the influence of absorption on the photonic band structure in the visible spectral region, 2003.*

Li, Modified thermal radiation in three dimensional photonic crystals, 2002, phys rev b, 66, 241103.*

Howard C. Hayden, "The Solar Fraud: Why Solar Energy Won't Run The World", ISBN 0971484503.

El-Kady, "Tunable narrow-band infrared emitters from hexagonal lattices", Photonics and Nanostructures—Fundamentals and Applications 1, (2003) 69-77.

M.U. Paralle, "Photonic crystal enhanced narrow band infrared emitters", Applied Physics Letters, Jun. 2002.

W.M. Yang, "Development of microthermophotovoltaic system", Applied Physics Letters, vol. 83, No. 27, 5255-5257.

G. Freymann, Tungsten inverse opals: The influence of absorption on the photonic band structure in the visible spectral region:, Applied Physics Letters, vol. 84, No. 2.

J. D. Joannopoulos, R. D. Meade, and J. N. Winn, "Photonic Crystals: Molding the Flow of Light", Princeton Univ. Press, 1995.

S. G. Johnson and J. D. Joannopoulos, "Photonic Crystals: The Road from Theory to Practice", Kluwer, 2002.

* cited by examiner

SYSTEM AND METHOD FOR THERMAL TO ELECTRIC CONVERSION

RELATED APPLICATIONS

This application claims the priority benefit of U.S. Provisional Application Ser. No. 60/518,488, entitiled "System and Method for Thermal to Electric Energy Conversion", filed Nov. 10, 2003.

TECHNICAL FIELD OF THE INVENTION

This invention relates generally to the field of solar generation and more specifically to a high reliability, high efficiency, dispatchable, distributed electric generation system.

BACKGROUND OF THE INVENTION

The field of solar generation suffers for a variety of reasons, including: poor energy conversion efficiency, high installation cost, high generation cost per watt hour, limited dispatchability, poor energy storage options, variable demand, high maintenance cost, high capital cost, poor reliability, low manufacturing volume, and poor aesthetics. Dispatchability is compromised by environmental factors such as: seasonal cycles, diurnal cycles, temperature, wind, and cloud cover. Efficiency is limited by airborne dust, dirt, and shadows. Other variables include: site placement, collector type, collector packaging, tracking, angle, latitude, cleanliness, and power conversion systems. Varying degrees of these factors severely limit public acceptance. All solar generation systems benefit from free fuel. Some solar generation systems have the benefits of distributed generation systems: no service interruptions due to transmission lines and very limited distribution losses.

Photovoltaic (PV) based systems suffer efficiency drops due to spectral mismatch, recombination losses, and resistive losses. Spectral mismatch occurs when the wavelengths of solar radiation, also called insolation, do not match the wavelengths of the semiconductor bandgap. Insolation wavelengths of higher energy than the material bandgap may generate an electron—hole pair at the PV bandgap energy with the remainder of the energy converted to heat. Insolation wavelengths longer than the material bandgap are simply converted to heat. Higher temperature and crystal defects increase recombination losses as a function of PV area. To maximize power transfer, the electric impedance of the source, a function of incident radiation, must be matched to the electric impedance of the load. Thus a system operating at maximum efficiency is subject to a collapse in delivered energy if the source impedance rises or the load impedance drops, such as from a motor starting, switch mode power supply, or a load step. Debris, dirt, or bird droppings may shadow a single cell, dropping efficiency by significantly more than the shadowed area. PV is generally not operated at the maximum power point, except when batteries are being charged, and then not at all times of day to save the expense of power electronics to capture the noon sun. More complex PV structures can offer some efficiency improvement, but have the same basic limiting factors. Without storage or backup generation, PV systems are not dispatchable. Solar energy input goes to zero at night. Energy storage is either very costly, or completely unutilized if economics dictate a system that is only capable of providing supplemental levels of energy, drawing the remainder of the energy need from the utility grid. The grid is not an energy storage device. It merely moves the problem of dispatching energy when needed from the end user to the electric utility. Energy storage in the form of lead acid batteries poses significant maintenance and environmental impact. Gridless operation frequently requires a backup generator to keep the size of batteries and PV cells within economic limits, except in very remote areas. Minimum power output requirements of grid independent solar systems during low insolation winter months can dramatically increase the required collector area and therefore cost.

Thermophotovoltaic (TPV) systems take a thermal source, create an optical emission, and photovoltaically generate an electric output. These systems generally suffer a mediocre, but better than solar, spectral match between the emitter and PV, poor efficiency for the capital cost, need for a high grade thermal source, parasitic losses, and low bandgap energy PV. These systems benefit from: better spectral match than pure PV, no partial shadowing, and reliability of a solid state device. Some systems include diurnal energy storage.

Solar thermal systems benefit in efficiency over PV systems in that the entire incident spectra is converted to heat. The heat is frequently used to spin a turbine, to generate electricity. However, these systems are generally too complex for non-utility users to maintain and operate. Diurnal storage and increased dispatchability is incorporated in systems such as trough based systems, such as SEGS, dish systems such as described in U.S. Pat. No. 5,932,029 "Solar Thermophotovoltaic Power Conversion Method and Apparatus", heliostat field systems such as Solar Two, and solar tower systems such as proposed by Solar Mission Technologies. Utility scale generation generally does not give the reliability of an Uninterruptible Power Supply due to distribution failures. Efficiency is reduced with distribution losses.

Waste heat is rarely recovered. When waste heat is available in batches, a primary source of fuel is consumed to fill in the interruptions. Storage of waste heat is not considered economical.

Thus a need has arisen for a distributed electrical generation system and method to overcome the limitations of existing systems.

SUMMARY OF THE INVENTION

In accordance with the present invention, a system and method for dispatchable solar generation is provided that addresses disadvantages and problems associated with other systems and methods.

A solar thermal input consists of a solar concentrator focused on an optical absorber material. The maximum attainable temperature is dependent on the amount of concentration, load, and parasitic losses. A parabolic trough concentrator with a circulating thermal transfer fluid collects thermal energy. A heat pump elevates the temperature of the energy and the energy is stored in a thermal mass. Use of a circulating fluid further allows for: a large thermal storage mass, peak insolation to be efficiently stored and converted to electricity at a lower rate, low cost concentrators, for the energy storage to be located in an environmentally protected location, for Uninterruptible Power Supply functionality, and storm damage to only impact the collectors. Thermal storage mass may be sized for seasonal insolation variations. The use of a heat pump allows efficient storage, low cost solar concentrators, and a high temperature output. Highly concentrated insolation from a parabolic dish collector may be used without a heat pump. Combined Cooling Heat and Power may be utilized either as an energy input or output.

Waste heat may also be used as an input to the heat pump. A multi fuel fossil fueled burner may provide backup. The burner may include a catalytic converter or an afterburner to reduce NOx emissions and a recuperator to improve efficiency. The heat pump and circulating fluid through the trough collectors prevents back streaming losses from the storage.

The system load may be a thermal load, such as a kiln, or building heating and cooling. Thermal storage reduces the dispatchability limitations with other solar kilns. The system may also include a TPV generator or other generator to supply an electric load. TPV generator consists of a 3D inverse opal photonic band gap (PBG) emitter material including a material with a complex dielectric constant, a high refractive index contrast between materials, and predominantly visible emissions, a filter, an iris to control energy incident on a Photo Voltaic cell, a PV cell, an ultracapacitor, and an output power supply. The iris matches the maximum power point of the PV to the load. An impulse is applied to the iris or to the electric load to determine the maximum power point. The ultracapacitor provides transient energy for a load step, switch mode power supply as a load, motor start, or maximum power point tuning impulse. The system benefits over PV plus STPV systems in that only one set of PV cells are required.

Vacuum and reflective insulation increase system efficiency. Multiple systems can be connected for larger output or for increased reliability. Three or more output busses can be connected to multiple generators, with proper fusing, for even higher reliability systems. Other features may include support for load management, grid connection, or remote maintenance.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EMBODIMENTS OF THE INVENTION

Figure 1:
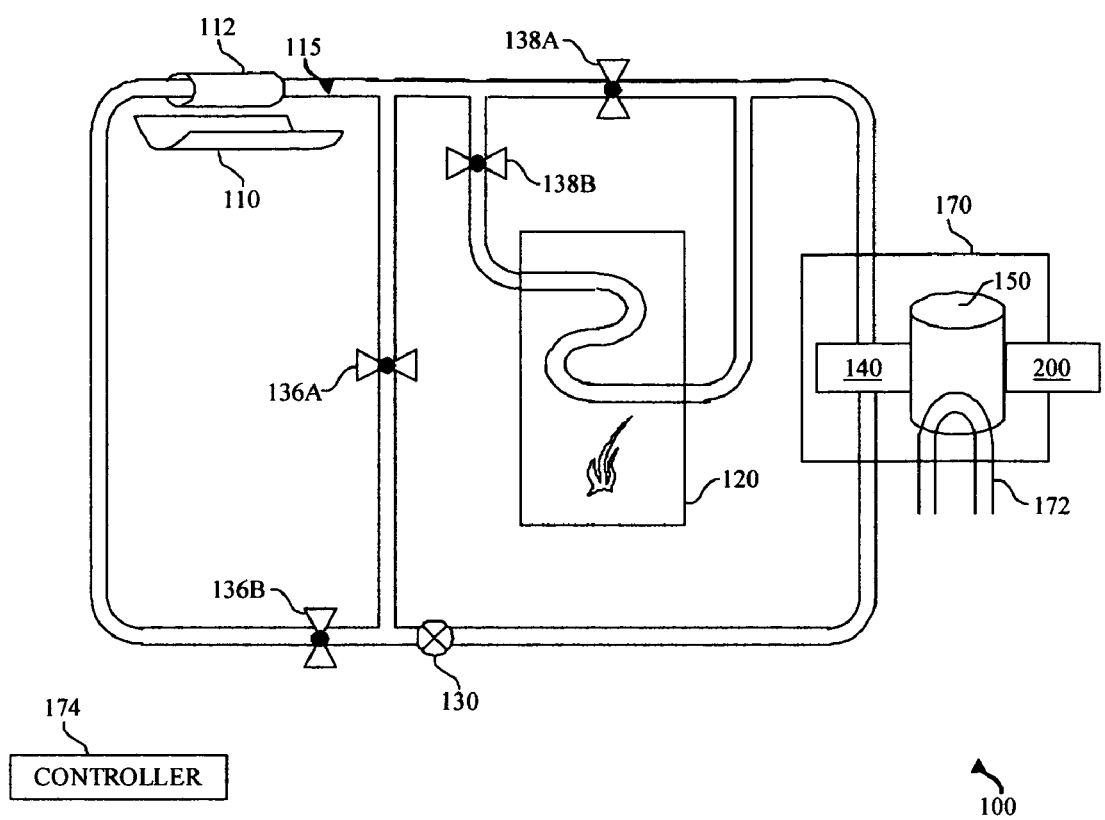
FIG. 1 is a diagram illustrating a thermal to electric power conversion system in accordance with the present invention.
Figure 2:
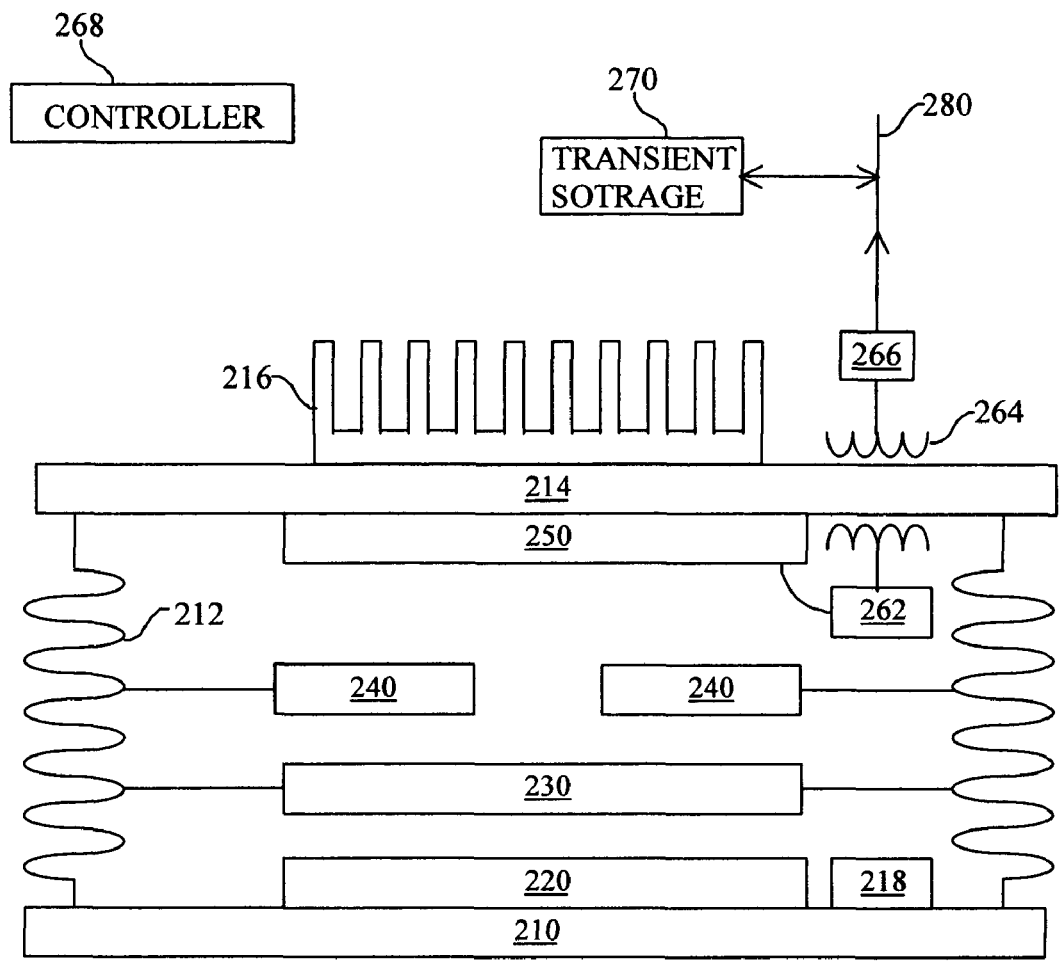
FIG. 2 is a diagram illustrating a TPV electric generator.
Figure 3:
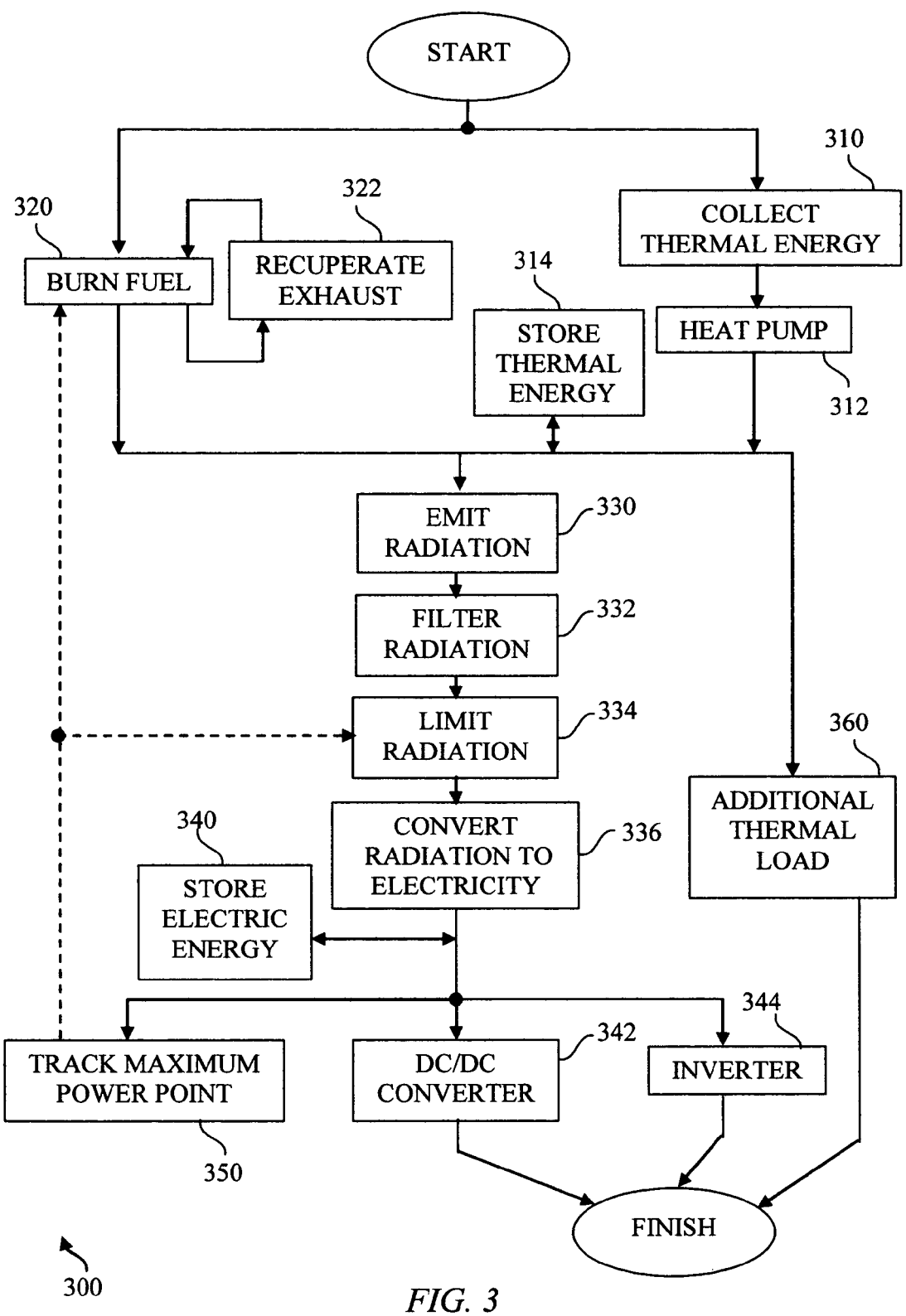
FIG. 3 is a flowchart demonstrating one method of thermal to electric power conversion in accordance with the present invention.

Embodiments of the present invention and their advantages are best understood by referring to FIGS. 1 through 3 of the drawings, in which like numerals refer to like parts.

FIG. 1 is a diagram illustrating a thermal to electric power conversion system 100 in accordance with the present invention. A variety of thermal input energy sources may be used. A parabolic trough solar concentrator 110 may provide a mid grade (around 300 C.) source of thermal energy input. The trough is controlled to track the position of the sun. Energy is focused onto absorber tube 112, which may be comprised of a high absorbtivity, low emissivity material such as dendritic nickel, vacuum insulated, and contain a circulating thermal transfer fluid 115. An example of one such a system is described in more detail in U.S. Pat. No. 5,058,565 "Solar Concentrator Device and Support Structure Therefor". An alternate embodiment may instead use a high-grade (around 1000 C.) solar thermal source such as a tracking parabolic dish solar concentrator or a field of heliostats. Another embodiment may use a very low-grade (around 100 C.) thermal source such as tracking or stationary flat plate solar collectors. In yet another embodiment, thermal energy is collected from the waste heat of another process, such as ceramics firing, metal smelting, electric turbine generation, fuel cell, geothermal, automotive engines, or other process with a Combined Cooling Heat and Power port. Low or mid grade sources may include heat pump 140 to allow higher effective output temperatures, more effective energy storage, and temperature regulation. Any thermal energy source may be combined with itself or any other source in a series or parallel configuration. Multiple heat pumps may be required when combining different temperature input energy sources. A preferred self-powered, solid state heat pump is described in application 10/937,831 "Directional Heat Exchanger" and is incorporated by reference.

Another thermal input option, fossil-fueled heat source 120 may provide a source of backup heat in the event of mechanical failures or insufficient input energy. Fossil-fueled heat source may include a recuperator to increase efficiency or a catalytic converter or an afterburner to reduce NOx emissions. In one embodiment, thermal transfer fluid 115, comprised of a mineral oil or a molten salt, is used to transport heat from the collectors to the generator. Pump 130 circulates thermal transfer fluid 115, while control valves 136A, 136B, 138A and 138B control the path of thermal transfer fluid 115 to provide backup heat and to minimize thermal losses during low insolation periods. The fluid flow topology can readily be modified for particular applications and insolation conditions.

Thermal storage mass 150 is comprised of a large mass of silica. Silica has been chosen for: high temperature operation, low cost, non-flammable, non-explosive, non-reactive in air and water, no thermal decomposition, no significant environmental hazards, and no environmental restrictions. A secondary containment, such as an earth berm, may reduce the hazard of leakage of a high-temperature liquid. Cost can be around $0.0001/(J*K). With larger useful temperature delta and phase change, more energy can be stored in any given mass or volume. Alternate thermal storage media may be selected for heat storage density over cost. Other thermal storage media are readily envisioned. Other thermal storage media may have all or some of these attributes. The quantity of thermal storage mass 150 may be selected to store enough energy to compensate for seasonal variations in insolation or batch operation for waste process heat. However, other embodiments may have more or less storage capacity. Hours or minutes of storage capacity may be selected for a smaller, lower cost embodiment, or where energy only need to be stored until another batch of product is ready for waste heat recovery. Thermal storage mass may be mounted on the ground or in the earth. Thermal storage mass 150 inherently provides the features of an Uninterruptible Power Supply, as the input power may be interrupted for a period of time with no loss of output power. Unlike well-known systems, there is no need to cut to an alternate source when utility power drops out or when the sun doesn't shine. There is no need to fail over to battery or flywheel UPS, or wait for a diesel or gasoline generator to come online. Advantages over pumped hydro and compressed air storage are the versatility in site location thermal storage, ability to store energy in the same form as its input energy, and storage requires no additional energy conversion steps with associated complexity and losses. Well known thermal storage systems store energy to provide for only minutes to a few days of load.

Thermal to electric converter 200 is a TPV generator, further described in FIG. 2. In an alternate embodiment, a fluid may be boiled, driving a turbine. In yet another embodiment, thermal to electric converter may be a sterling engine coupled to a generator. Still other embodiments may use thermoelectric or thermionic generation.

Hot water and/or hot air and/or absorptive chiller hot water can be taken directly from a fluid loop 172 in the thermal storage material 150. This eliminates losses of the thermal to electric conversion and power conditioner for Combined Cooling Heat and Power applications.

Thermally hot components are vacuum insulated in vacuum container 170 to minimize conductive and convective heat transfer. Vacuum container 170 may be a cylindrical pressure tank and also contains reflective and/or refractory insulation to minimize radiatively coupled heat transfer. Heat pump 140 and a TPV thermal to electric converter 200 are directly attached to thermal storage mass 150. This minimizes the number of penetrations of plumbing and structural support members through the insulation, increasing insulation efficiency.

Reliability increases are seen from the solar thermal concentrators themselves being more durable against the perils of weather and environmental mechanical stress than well-known PV installations. For a space based system, this eliminates loss of PV cells due to micrometeorites. For terrestrial systems, the remainder of the system can be buried, mitigating damage due to vandalism, theft, storm, vehicle collision, Lightning Electro Magnetic Pulse (LEMP), Nuclear Electro Magnetic Pulse (NEMP), etc. Additionally, the system may reduce the exposure of the electric load to lightning. The system is true zero emission generation unless a non-zero emission backup heat source is required by the consumer. System operation may be virtually silent. No air is input or exhaust is output unless operating on backup fossil fuel burner.

Multiple systems can be connected in a variety of configurations: in series for higher voltage operation, in parallel for larger output power, connected in an N+1 or N+M configuration, or connected to multiple redundant busses. Redundancy may also be at the subsystem level, allowing one portion of the system to be more redundant than another.

Multiple parallel generators may be connected using three or more redundant parallel busses. Each generator has a source fuse to each redundant buss and each load has a connection to each redundant buss. The loads are not allowed to back feed to another buss. This can be accomplished with a relay, diode, SCR, IGBT, or other switch. The source fuse is sized to handle a current of one less than the number of busses divided by rated source current times, or the rated source current, whichever is lesser. Thus it takes less current to blow the fuse under a fault condition. This is important with a high impedance source, which may fold back and not blow the fuse at all. Transient storage must be capable of supplying necessary fusing current. If loads are allowed to pick from some, but not all of the multitude of busses, the buss current rating may be reduced. In the well known 2 buss system, the load may choose from either of the 2 busses and thus it is possible for all of the current to be drawn from a single buss. Alternatively, well known single or dual buss distribution may be used.

The system can be remotely monitored for maintenance and diagnostic functions. Underperforming components can generate a maintenance dispatch. Comparison of collected insolation from nearby systems can indicate if the solar concentrators need cleaning. Controller 174 performs system control functions.

FIG. 2 is a diagram of a TPV thermal to electric converter 200. PBG 220 is a thermally-stimulated selective radiative emitter with a wide full 3D band gap and visible or near-infrared emissions. PBG 220 is preferred to have an inverse opal structure for low cost and one material with a complex dielectric constant for increased emissions. Filter 230 filters out wavelengths emitted by PBG 220 which cannot be efficiently converted by PV cell or cells 250. Filter 230 is a stacked dielectric filter, but other embodiments may combine a phosphor, quantum dot, PBG, or other filter. A switch mode power supply without vacuum feed-throughs consists of: primary side switches 262, transformer isolation 264, secondary side switch and controller 266, and is coupled to electric output 280. Other power supplies coupled to well known vacuum feed-throughs are envisioned. Controller 268 adjusts the incident power on PV cell 250 by adjusting reflective iris 240 to match the electric load to the maximum power point of PV cell 250 to optimize efficiency. Controller 268 periodically pulses the incident power on PV cells 250 to determine the maximum power point by monitoring the slope of efficiency versus incident power. A lookup table may be used to generate an approximate value and updated with learned values. Alternatively, a positive and/or negative load transient may be generated by transient storage 270. Transient storage 270 provides electric energy storage for any transient electric loads, such as: motor starts, load steps, switch mode power supplies, and maximum power point tracking pulses. Transient storage 270 is a well known bank of ultracapacitors with a bidirectional power supply. In alternate embodiments, transient storage may be a battery or flywheel. Attempting to draw power from PV cell 250 in excess of its maximum power point will cause the output voltage to sag, collapse, or possibly drop the load. Motor starts, switch mode power supplies at the load, or load steps may draw excessive power and be damaged by insufficient supplied power. Hot side 210, bellows 212, cold side 214, and getter 218, comprise a vacuum canister to limit conductive and convective heating of PV cells 250. Heat sink 216 prevents efficiency losses due to hot PV cells 250. A further description is provided in 10/(formally filed Nov. 9, 2004) "System and Method for Enhanced Thermophotovoltaic Generation". Alternate embodiments may use other TPV generators.

FIG. 3 is a flowchart demonstrating one method of thermal to electric power conversion in accordance with the present invention. Thermal energy is collected in step 310. The collector may be a parabolic trough solar concentrator, dish solar concentrator, or a collector of waste heat from another process. Conversion of solar energy to thermal energy allows efficient utilization of all incident wavelengths and peak insolation levels. Additionally, the generation capacity can be placed in an environmentally secure location, limiting damage from terrestrial based storms or space based micrometeorites. Optionally, temperature may be raised in step 312, increasing storage efficiency and thermal to electric conversion input temperature. Optionally, thermal energy is stored in step 314. As a backup energy source, a fossil fuel, bio fuel or other fuel may be burned in step 320. Optionally, exhaust heat may be recuperated in step 322. Optionally, thermal loads may be supplied directly from collected and stored heat in step 360.

Thermal energy is converted and radiated as optical energy in step 330. Step 330 employs a photonic crystal possessing a 3D PBG and an inverse opal structure. Optical emissions are filtered in step 332 to maximize conversion efficiency. Output power is optimized with a reflective iris in step 334. PV cells convert spectrally shaped radiation to electricity in step 336. Electricity is stored in step 340 to compensate for transients and load steps, allowing step 350 to optimize incident radiation by tracking the maximum power point of PV cells. Step 350 may also control the burn rate of backup heat source. Step 342 provides a DC electric output and step 344 provides an AC electric output. Steps 340, 342, and 344 may be combined to optimize power conversion electronics. In alternative embodiments, generating electricity in steps 330 thru 336 may be replaced with another TPV generator, turbine generator, sterling engine, thermoelectric generator or thermionic generator.

Any step may be combined with itself in a parallel fashion, or any group of steps may be combined in a series or parallel fashion to achieve the desired power flows or desired reliability.

Although embodiments of the system and method of the present invention have been illustrated in the accompanying drawings and described in the foregoing detailed description, it will be understood that the invention is not limited to the embodiment disclosed, but is capable of numerous rearrangements, modifications, and substitutions without departing from the spirit of the invention as set forth and defined by the following claims.

What is claimed is:

1. A system for converting solar energy to electric energy comprising:
    a parabolic trough insolation concentrator;
    an insolation to thermal power conversion;
    a thermal energy storage mass;
    a thermophotovoltaic converter, including:
        a thermally stimulated photonic band gap emitter and photovoltaic cell, and
        an iris interposed between said photonic band gap emitter and said photovoltaic cell; and
    a maximum power point tracking control means.

2. The system of claim 1, further including a thermal energy storage mass, where the heat capacity of said mass is sufficient to store greater energy than is required to compensate for seasonal variations.

3. The system of claim 1, including a heat pump, where the cold side of said heat pump is coupled to said parabolic trough concentrator and the hot side of said heat pump is coupled to said thermophotovoltaic converter.

4. The system of claim 1, where the crystal structure of said photonic band gap emitter is that of an inverse opal.

5. The system of claim 1, where said photonic band gap emitter is composed of at least one material possessing a complex dielectric constant.

6. The system of claim 1, where the lattice constant of said photonic band gap emitter corresponds to thermal emissions peaking in the visible spectra.

7. The system of claim 1, further comprising one or more filters interposed between said photonic band gap emitter and said photovoltaic cells.

8. The system of claim 1, said maximum power point tracking control means is operable to move the operating power point to the maximum power point of said photovoltaic cells by varying the amount optical power emitted from said photonic band gap emitter which is incident on said photovoltaic cells,
    where the output of said maximum power point tracking control means is coupled to said iris.

9. The system of claim 8, where said maximum power point control means further includes a power point slope feedback control means operable to determine the direction of said operating power point to said maximum power point,
    where said slope feedback means is further operable to produce a positive and/or negative transient of incident power applied to said photovoltaic cells via said power limiter,
    where the slope of the response of said photovoltaic cells to said transient is proportional to the slope of the efficiency of the electric output power from said photovoltaic cells.

10. The system of claim 8, where said maximum power point control means further includes a power point slope feedback control means operable to determine the direction of said operating power point to said maximum power point,
    where said slope feedback means is further operable to produce a positive and/or negative impulse transient of electric load applied to said cells,
    where the slope of the response of said photovoltaic cells to said transient is proportional to the slope of the efficiency of the electric output power from said photovoltaic cells.

11. The system of claim 8, where said maximum power point control means includes a lookup table to provide an approximate value of incident power necessary for operation near the maximum power point of said photovoltaic cells.

12. The system of claim 10, where said power point slope control means includes electrical energy storage sized to compensate for said transient produced by said maximum power point control means.

13. The system of claim 1, where thermal energy is further supplied to external environmental heating and cooling systems.

* * * * *